INVENTOR.
WILLIAM F. TURNOW

INVENTOR.
WILLIAM F. TURNOW
BY
*Floyd M. Harris*
ATTORNEY

United States Patent Office 3,085,240
Patented Apr. 9, 1963

3,085,240
TRUE-MOTION RADAR DISPLAY SYSTEM
William F. Turnow, Riverton, N.J., assignor to Radio Corporation of America, a corporation of Delaware
Filed Dec. 24, 1958, Ser. No. 782,935
12 Claims. (Cl. 343—5)

This invention relates to true-motion radar and particularly to an improved circuit for sensing when the mark on the radar screen indicative of own ship's position reaches a preset distance from the center of the screen.

In a true-motion radar system, fixed targets on the radar screen remain in fixed positions and moving targets move. Since the radar system is mounted on a moving vehicle (ship, aircraft or the like), the mark on the radar screen indicative of one's own position also moves. After a certain amount of time, the mark approaches the edge of the screen and must be reset. If the display is of the "north-stabilized" type, the point along the edge of the screen reached by the mark depends upon the ship's course during the viewing interval and its initial and final headings. (A conventional north-stabilized display is one in which targets remain in fixed angular positions on the radar screen regardless of changes in own vehicle's heading.)

In known true-motion radar systems of the north-stabilized type, own ship's mark is reset by manual means. The radar operator observes when the mark attempts to go off the edge of the screen. He then manually adjusts the deflection voltages applied to the off-centering coils or plates of the radar indicator in a sense and amount to reset the mark. Preferably, the reset position is at or near an edge of the radar screen such that if own vehicle continues to travel in the same direction, own vehicle's mark will pass through the center of the screen.

An object of the present invention is to provide a circuit for sensing when the mark indicative of own ship's position reaches a predetermined distance from the center of the display for automatically actuating a reset circuit for the mark.

According to the invention, the sensing means determines when $x^2+y^2=r^2$, where $x$ and $y$ are cartesian coordinates of the mark when it is on a "reset circle" on the radar screen, and $r$ is the radius of the reset circle. The reset circle is close to the edge of the screen and has its center at the center of the screen. In a preferred form of the invention, the sensing means may include a pair of potentiometers, one driven by a shaft the rotation of which is proportional to the $y$ coordinate of own ship's position and the other driven by a shaft the rotation of which is proportional to the $x$ coordinate of own ship's position. A relay is connected to the sliders of the two potentiometers. A source of voltage is connected across the ends of one of the potentiometers and the ends of the other potentiometer are connected to ground.

The invention is illustrated in the drawings listed below and is explained in greater detail in the explanation following the list.

Figure 1:
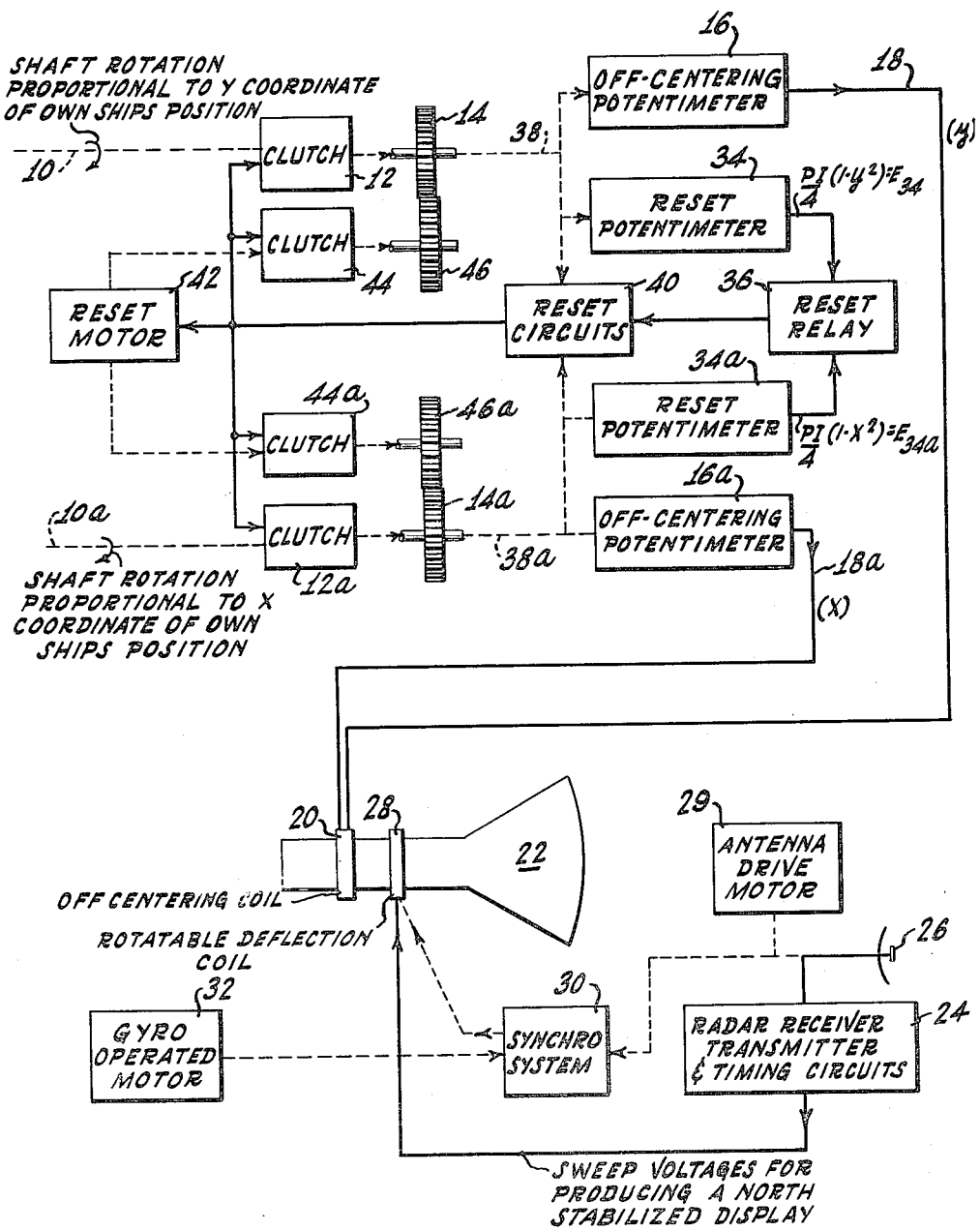
FIG. 1 is a block circuit diagram of a portion of a true-motion radar system in which the present invention is incorporated.

To simplify the present patent application, only those portions of the true-motion radar system which are directly applicable to the invention are illustrated and explained. A more detailed description of the complete system may be found in application, Serial No. 782,936, by C. E. Moore, filed on the same day as this application, namely, December 24, 1958.

The radar system described in the application above is assumed to be located on a ship. It includes electromechanical means for producing two shaft rotations, one proportional to the $y$ coordinate of own ship's position and the other proportional to the $x$ coordinate of own ship's position. The inputs to the electromechanical means include data as to own ship's speed and bearing. The $y$ and $x$ shafts are shown at 10 and 10a in FIG. 1. These shafts are connected to similar components. Therefore, in the discussion which follows, only one set of components is described; analogous components of the other set are legended with the same reference numeral followed by the letter "a."

FIG. 1 should be referred to first: Shaft 10 is connected through a magnetic clutch 12 and gear 14 to an off-centering potentiometer 16. Clutch 12 (and 12a) is normally energized so that shaft 10 normally drives the off-centering potentiometer 16. The off-centering potentiometer produces at lead 18 a D.C. voltage having a magnitude proportional to the $y$ coordinate of own ship's position. In like manner, potentiometer 16a produces at lead 18a a D.C. voltage the magnitude of which is proportional to the $x$ coordinate of own ship's position. These voltages are applied to the $x$ and $y$ coils of the off-centering coil yoke 20 of cathode ray tube 22. The coils may instead be deflection plates if electrostatic rather than magnetic deflection is desired. As is understood, the tube includes means for producing a focused electron beam and means for intensifying the beam in synchronism with the pulse transmissions from the radar system. The intensified mark which is produced is the center of a PPI display. The $x$ and $y$ deflection voltages applied to the off-centering coil 20 move the center of the display in a direction and amount corresponding to the direction and extent of the ship's travel, thereby producing true-motion.

The major components of the radar system are illustrated very briefly at the lower right of the figure. The radar receiver, transmitter and timing circuits are illustrated by the single block 24. The antenna is shown at 26 and it is driven in azimuth by the antenna drive motor 29. The antenna is also connected through a synchro transmitter, differential generator, control transformer and the like to the rotatable deflection coil 28 of the cathode ray tube. The synchro system is illustrated schematically by the single block 30. The gyro operated motor is connected to the synchro differential generator portion of the synchro system 30. As is well understood, the function of the gyro operated motor is to drive the generator in accordance with a directional reference, thereby north-stabilizing the cathode ray tube display. While not shown in the figure, the system may include means similar to those shown in the application referred to above for permitting relative bearings rather than true bearings to be read from the display. However, this is not an essential feature of the present system. It operates with any unstabilized or north-stabilized system, whether of the conventional true-bearing type or of the type described in the patent application above.

The present invention relates to a circuit for sensing when the mark on the display indicative of own ship's position reaches a predetermined radius and is to be reset. It includes the reset potentiometers 34 and 34a and the reset relay 36. The reset potentiometers are driven by the same shafts 38 and 38a as drive the corresponding off-centering potentiometers. Shafts 38 and 38a also drive the reset circuits 40. The reset circuits are connected to a reset motor 42 and to the clutches 12, 12a and 44, 44a.

In operation, when the sum of a square term $x^2$ of the output voltage of potentiometer 34a and a square term $y^2$ of the output voltage of potentiometer 34 is equal to $r^2$, reset relay 36 is actuated. (As will be explained later, $r$ is the radius of the reset circle.)

When the rest relay is actuated, the reset circuits 40 are energized. These are shown in detail in the application referred to above and their operation is not part of the present invention. In brief, the reset circuits do the following. They inactivate clutches 12 and 12a and energize normally inactive clutches 44 and 44a. They also start reset motor 42. The reset motor drives shafts 38 and 38a through clutches 44 and 44a and gears 46, 14 and 46a, 14a. The motor continues to drive until the off-centering potentiometers reset the mark indicative of own ship's position to a new place on the indicator screen. When the mark is properly reset, the reset relay is inactivated, the reset motor stops, clutches 44 and 44a are inactivated and clutches 12 and 12a are re-energized.

Figure 2:
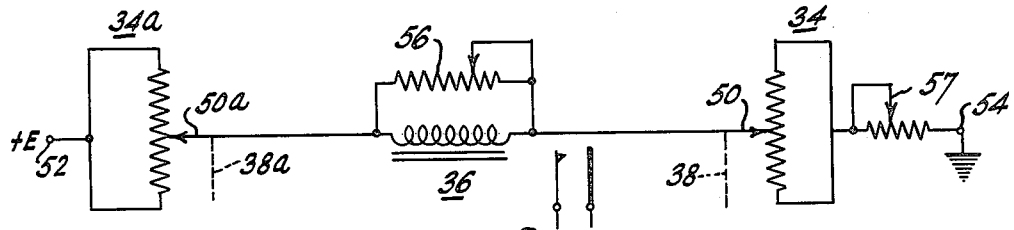
FIG. 2 is a schematic circuit diagram of a preferred form of the present invention.
Figure 4:
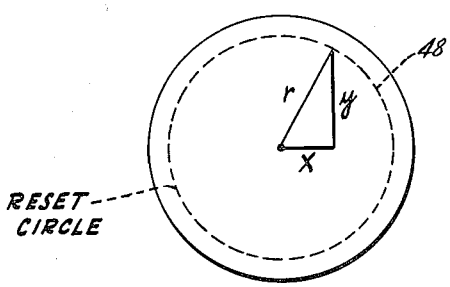
FIG. 4 is a sketch of the screen of a radar display used to explain the theory of operation of the circuit of FIG. 2.

The circuit of the present invention is shown in greater detail in FIG. 2. The $x$ reset potentiometer 34a appears at the left and the $y$ reset potentiometer 34 at the right. The sliders 50 and 50a of the potentiometers are driven by shafts 38 and 38a (see also FIG. 1). A source of voltage E is connected to terminal 52 and therefore appears at both ends of potentiometer 34a. The two ends of potentiometer 34 are grounded. The coil of relay 36 is connected between sliders 50a and 50. The screen of the cathode ray tube indicator is shown in FIG. 4. The dashed circle 48 near the edge of the screen is the reset circle. In a practical system, the dashed line need not appear on the face of the tube. In the practical system, the reset circle radius may be on the order of ⅝ or so of the tube radius. The reset circle is a locus with a constant distance $r$ from the center of the screen. By the Pythagorean theorem, $r^2 = x^2 + y^2$ where $x$ is the $x$ coordinate and $y$ is the $y$ coordinate of own spot's position when it reaches the reset circle. Thus, whenever the square of the $x$ axis deflection of own ship's spot from the center plus the square of the $y$ axis deflection of own ship's spot from the center equals the constant quantity $r^2$, the PPI sweep center or own ship's position must be on the reset circle.

The reset circuit shown in FIG. 2 obtains voltages with square terms corresponding to the squares of the $x$ and $y$ and adds them. These are voltages $E_{34}$ and $E_{34a}$, where $E_{34}$ is the voltage from terminal 54 to slider 50 and $E_{34a}$ is the voltage from slider 50a to terminal 52. Relay 36 is actuated when the sum of the two square terms is equal to $r^2$. This can be better understood from a consideration of the following:

The potentiometers are linear. Assume that the total resistance of potentiometer 34a equals the total resistance of potentiometer 34 equals P. Sliders 50 and 50a are initially set to the centers of their respective potentiometers. Potentiometer 34a is the one which is driven by the shaft, the extent of rotation of which is proportional to the $x$ coordinate of own ship's position. When the mark is at the reset circle, slider 50a has been displaced from its center position a fraction $x$ of the distance from the center to the end of the potentiometer. This fraction $x$ is equivalent to a resistance $$\frac{P}{2}x$$

Figure 3:
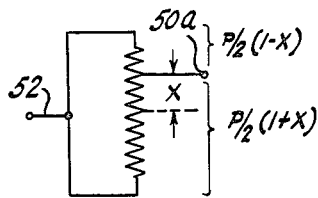
FIG. 3 is a schematic drawing to aid in explaining FIG. 2.

The fraction $x$ is equal to the fraction of the radius $r$ that the $x$ coordinate voltage has deflected the mark on the indicator screen. This fraction is represented by the line $x$ in FIG. 4. Assume that the displacement is in the up direction as indicated in FIG. 3. Then the resistance above the sliders is $$\frac{P}{2} - \frac{P}{2}x \text{ or } \frac{P}{2}(1-x)$$

and the resistance below the sliders is $$\frac{P}{2}(1+x)$$

The resistance between terminals 52 and 50a in FIG. 3 is then $$\frac{P}{4} - x^2 \frac{P}{4}$$

This expression includes a constant term $$\frac{P}{4} \text{ and a term } x^2 \frac{P}{4}$$

In a similar manner, when the mark is at the reset circle, the $y$ shaft 38 has moved slider 50 a fraction $y$ of the distance from the center to the end of the potentiometer. $y$ may or may not equal $x$. The fraction $y$ is equal to the fraction of the radius $r$ that the $y$ coordinate voltage has deflected the mark on the indicator screen. This fraction is represented by the line $y$ on the indicator screen (FIG. 4). By calculations similar to those above, it can be shown that the resistance of potentiometer 34 from terminal 54 to slider 50 is $$\frac{P}{4} - y^2 \frac{P}{4}$$

Thus, there is a term $$y^2 \frac{P}{4}$$

which varies as the square of the displacement $y$. The total resistance Z from terminal 52 to terminal 54 is:

$$\frac{P}{2} + R_{36} - \left(x^2\frac{P}{4} + y^2\frac{P}{4}\right) \text{ or } \frac{P}{2} + R_{36} - \frac{P}{4}(x^2+y^2)$$

where $R_{36}$ is the resistance of relay 36. By Ohm's law, the current I through the circuit equals $E/Z$. Assuming that $r=1$, then one point at which the relay should close is $x=1$ and $y=0$. At that time, $$I = \frac{E}{\frac{P}{4} + R_{36}}$$

In operation, the off-centering potentiometers 16, 16a are driven until own ship's mark is on the reset circle at, for example, $x=1=r$, $y=0$. The circuit of FIG. 2 is then adjusted so that slider 50a is at one end of its potentiometer 34a ($x=1=r$), and slider 50 is at the center of its potentiometer 34 ($y=0$). The current I is then adjusted to a value at which the relay just closes. I may be varied either by varying the relay resistance ($R_{36}$) or the circuit voltage E (see the last equation in the preceding paragraph). The former may be varied by means of adjustable resistor 56 placed across the relay coil. The latter may be varied by a potentiometer in series with terminal 54, for example, as shown at 57. When the circuit is properly adjusted, any time own ship's spot reaches the reset circle, no matter where this occurs on the reset circle, the relay will close.

Figure 5A:
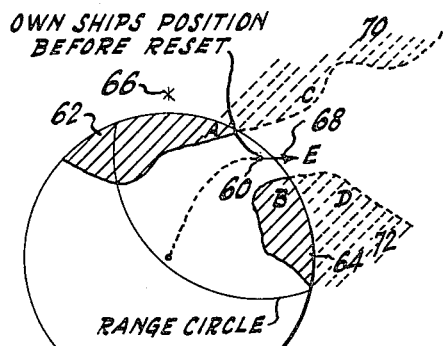
FIGS. 5a and 5b are sketches of a north-stabilized, true-motion radar display before and after reset, respectively.
Figure 5B:
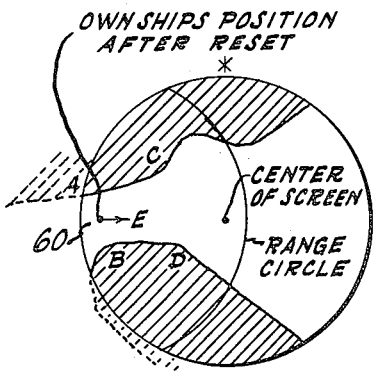

Displays before and after reset are shown in FIGS. 5a and 5b. In FIG. 5a, own ship's mark is shown at 60. It is at the reset circle (not shown) and between two land masses 62 and 64. The display is assumed to be north-stabilized and north is assumed to be at the upper center of the display as indicated by the asterisk 66. The ship is going off the display at approximately the northeast edge of the display and it is traveling east as indicated by arrow 68. The dashed cross-hatched areas 70 and 72 are not actually seen by the operator but are merely filled in to show the continuation of land masses 62 and 64.

The letters A, B, C and D are merely for purposes of identification.

When own ship reaches the reset circle, the reset relay is closed and the reset circuits are actuated. These reset own ship's position as shown in FIG. 5b. The reset point is slightly closer to the center of the screen than the radius r of the reset circle to avoid tripping the reset circuit shortly after reset. Since the ship is traveling east, it will be reset close to the west edge of the screen. The circuits for accomplishing this are not part of the present invention but are explained in detail in the application referred to above. The letters A, B, C and D should be compared with the corresponding letters in the preceding figure to obtain a feeling for the relative positions of the various areas displayed.

What is claimed is:

1. In a true-motion radar system, means for producing a display which includes a mark indicative of own vehicle; means for producing voltages corresponding to the $x$ and $y$ coordinates of own vehicle's position, means for controlling the position of said mark on said display as a function of said voltages; a reset circuit; and means responsive to said voltages for actuating said reset circuit when $x^2+y^2=r^2$, where $r$ is a radius of a circle the center of which is at the center of the display, and $x$ and $y$ are the $x$ and $y$ coordinates of the mark when it is on the reset circle.

2. In a true-motion radar system, a pair of driven shafts, the extent of movement of one representing the $x$ coordinate of own vehicle's position and the extent of movement of the other representing the $y$ coordinate of own vehicle's position; means for producing a display which includes a mark indicative of own vehicle; means driven by said shafts for moving said mark in a direction and amount corresponding to the direction and extent of movement of own vehicle; a reset circuit connected to the last-named means; and means driven by said shafts for actuating said reset circuit when $x^2+y^2=r^2$, where $r$ is the radius of a circle the center of which is at the center of the display, and $x$ and $y$ are the $x$ and $y$ coordinates of the mark when it is on the reset circuit.

3. In a true-motion radar system for a moving vehicle, in combination, a pair of linear potentiometers of equal value; a relay connected between the sliders of the potentiometers; one connection for a source of voltage connected to both ends of one potentiometer and the other connection for said source of voltage connected to both ends of the other potentiometer; and means for driving the two sliders in accordance with the $x$ and $y$ coordinates respectively, of own vehicle's position.

4. In a true-motion radar system for a moving vehicle; means producing outputs proportional to the instantaneous $x$ and $y$ coordinates of own vehicle's position; means for producing a display which includes a mark indicative of own vehicle; circuit means responsive to the first-named means and connected to the display means for moving the mark in a direction and amount proportional to the direction and distance traveled by own vehicle; a reset circuit; and means responsive to the first-named means for sensing when said mark moves a predetermined distance from the center of the display for actuating said reset circuit.

5. In a true-motion radar system for a moving vehicle; means producing outputs proportional to the instantaneous $x$ and $y$ coordinates of own vehicle's position; means for producing a display which includes a mark indicative of own vehicle; circuit means responsive to the first-named means and connected to the display means for moving the mark in a direction and amount proportional to the direction and distance traveled by own vehicle; a reset circuit; and means including a pair of potentiometers, one driven by the output proportional to the $x$ coordinate of own vehicle's position, and the other driven by the output proportional to the $y$ coordinate of own vehicle's position for sensing when said mark moves a predetermined distance from the center of the display for actuating said reset circuit.

6. In a true-motion radar system for a moving vehicle; means producing mechanical outputs proportional to the instantaneous $x$ and $y$ coordinates of own vehicle's position; means for producing a display which includes a mark indicative of own vehicle; circuit means responsive to the first-named means and connected to the display means for moving the mark in a direction and amount proportional to the direction and distance traveled by own vehicle; a reset circuit; a pair of potentiometers, each connected to produce an output voltage having a square term, one driven by the output proportional to the $x$ coordinate of own vehicle's position, and the other by the output proportional to the $y$ coordinate of own vehicle's position; and means connected to the potentiometers and to the reset circuit for actuating the latter when the sum of the two square terms equals the square of a constant $r$.

7. In a true-motion radar system for a moving vehicle; a pair of shafts rotated amounts proportional to the instantaneous $x$ and $y$ coordinates of own vehicle's position; means for producing a display which includes a mark indicative of own vehicle; circuit means connected to the two shafts and to the display means for moving the mark in a direction and speed corresponding to the direction and speed of the vehicle; a reset circuit; a pair of means, one driven by each shaft, each for producing an output having a term which varies as the square of its shaft rotation; and means connected to said pair of means for actuating said reset circuit when the sum of the two square terms equals the square of a constant $r$.

8. In the system as set forth in claim 7, said last-named means comprising a relay.

9. In a true-motion radar system for a moving vehicle, a pair of rotating shaft means, one rotating at a speed proportional to the $x$ and the other rotating at a speed proportional to the $y$ component of own vehicle's movement, whereby the instantaneous shaft means positions with respect to a reference position are indicative of the $x$ and $y$ coordinates of own vehicle's position with respect to a reference position; a pair of electrical circuits, one driven by each shaft, one producing an output voltage having a term which varies as $x^2$ and the other producing an output voltage having a term which varies as $y^2$, where $x$ and $y$ are position coordinates; and means connected to said pair of electrical circuits for producing an output when $x^2+y^2=r^2$, where $r$ is a constant, said pair of electrical circuits comprising a pair of potentiometers, and a source of voltage having two terminals, one connected to the ends of one potentiometer and the other connected to the ends of the other potentiometer; and said last-named means comprising a relay connected between the sliders of the potentiometers.

10. In a true-motion radar system for a moving vehicle, in combination, a pair of linear potentiometers of equal value; one connection for a source of voltage connected to both ends of one potentiometer and the other connection for said source of voltage connected to both ends of the other potentiometer; a relay connected between the sliders of the potentiometers and adjusted to close when one slider is at the center of its potentiometer and the other is at an end of its potentiometer; and means for driving the two sliders in accordance with the $x$ and $y$ coordinates respectively, of own vehicle's position, where $x$ and $y$ are arbitrarily given the value zero when the two sliders are at the centers of their potentiometers.

11. In a true-motion radar system, means for producing a display which includes a mark indicative of own vehicle; means for producing voltages corresponding to the $x$ and $y$ coordinates of own vehicle's position, means for controlling the position of said mark on said display as a function of said voltages; and means responsive to said voltages for producing a signal voltage when $x^2+y^2=r^2$, where $r$ is a radius of a circle the center of which is at the center of the display, and $x$ and $y$ are the $x$ and $y$ coordinates of the mark when it is on said circle.

12. In a true-motion radar system for a moving vehicle; means producing outputs proportional to the instantaneous $x$ and $y$ coordinates of own vehicle's position; means for producing a display which includes a mark indicative of own vehicle; circuit means responsive to the first-named means and connected to the display means for moving the mark in a direction and amount proportional to the direction and distance traveled by own vehicle; and means responsive to the first-named means for sensing when said mark moves a predetermined distance from the center of the display.

References Cited in the file of this patent

UNITED STATES PATENTS 2,589,584    Thompson _____ Mar. 18, 1952

OTHER REFERENCES

"Electronic Instruments" M.I.T. Rad. Labs. Series, vol. 21, by Greenwood et al., 1948, published by McGraw-Hill Book Pub. Co., N.Y., pp. 138–140.